No. 783,982. PATENTED FEB. 28, 1905.
L. PRIEST.
VEHICLE BODY.
APPLICATION FILED JAN. 31, 1903.
2 SHEETS—SHEET 1.
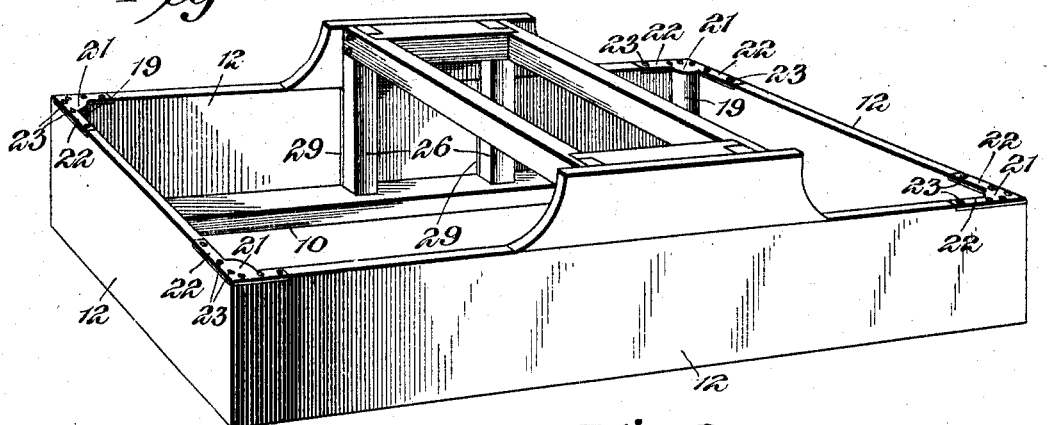
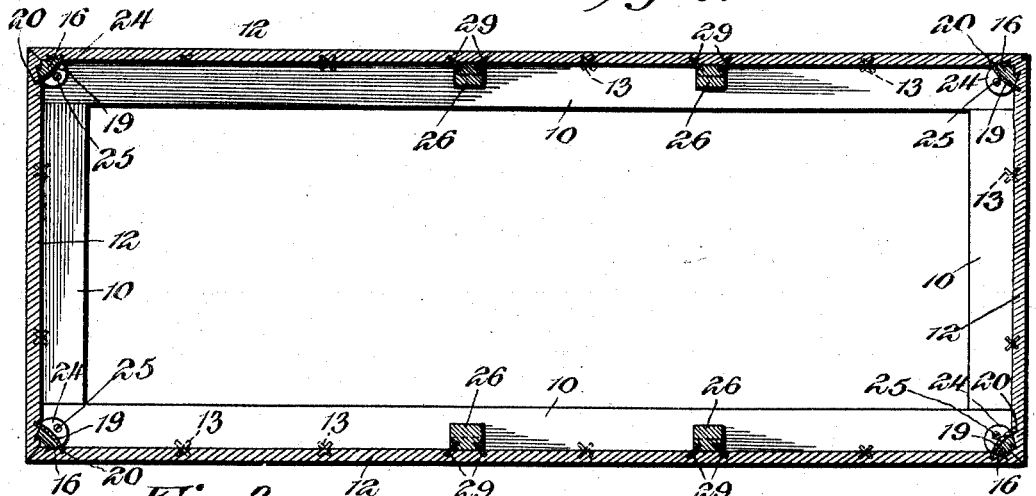
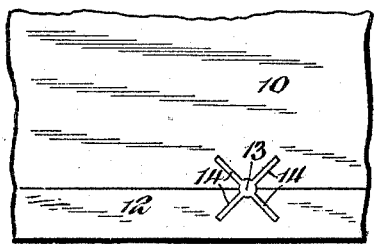
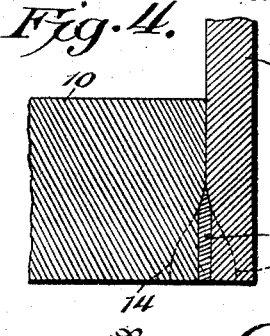
Witnesses
Howard D. Orr
B. G. Foster
Inventor,
Louis Priest,
By E. G. Siggers
Attorney

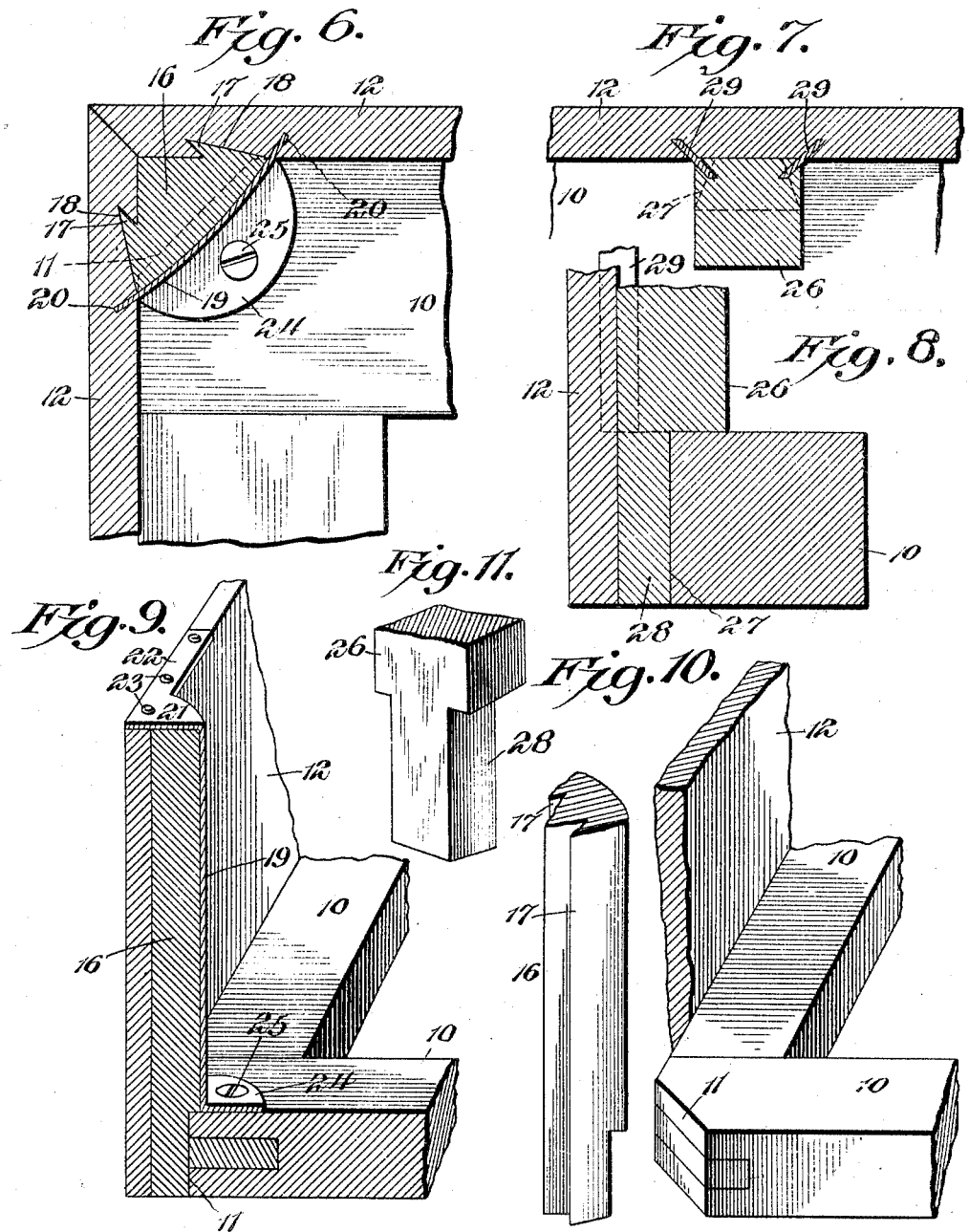

No. 783,982. Patented February 28, 1905.

UNITED STATES PATENT OFFICE.

LOUIS PRIEST, OF MOUNT PLEASANT, MICHIGAN.

VEHICLE-BODY.

SPECIFICATION forming part of Letters Patent No. 783,982, dated February 28, 1905.

Application filed January 31, 1903. Serial No. 141,312.

*To all whom it may concern:*

Be it known that I, LOUIS PRIEST, a citizen of the United States, residing at Mount Pleasant, in the county of Isabella and State of Michigan, have invented a new and useful Vehicle-Body, of which the following is a specification.

One of the features of this invention relates to a novel corner-joint wherein the abutting panels or walls are securely fastened together throughout their entire widths, so that said joint will not crack or become broken. At the same time the necessity of plugs and similar devices is obviated.

Another feature resides in the means for fastening the seat-posts in place, said means serving to strengthen the panels and the posts, thus constituting braces for the same.

Still another feature relates to simple means for fastening the sill-frame and panels together without the necessity of passing any devices through the outer faces of the latter, and therefore the outer surfaces of the panels are smooth and unbroken.

The preferred embodiment of the invention is illustrated in the accompanying drawings, wherein—

Figure 1 is a perspective view of a vehicle-body constructed in accordance with the present invention. Fig. 2 is a horizontal sectional view through the same. Fig. 3 is a detail bottom plan view showing one of the fastening devices for connecting the wall or panel and the sill. Fig. 4 is a vertical sectional view through the same. Fig. 5 is a detail perspective view of one of the connecting devices. Fig. 6 is a horizontal sectional view, on an enlarged scale, through one corner of the body. Fig. 7 is a similar view through one of the seat-posts. Fig. 8 is a vertical sectional view through the structure illustrated in Fig. 7. Fig. 9 is a sectional perspective view through one corner of the body. Fig. 10 is a detail view showing the parts separated, and Fig. 11 is a detail perspective view of one of the seat-posts.

Similar reference-numerals indicate corresponding parts in all the figures of the drawings.

In the embodiment illustrated a base-frame is employed comprising angularly-disposed sills 10, tenoned together at their ends and having their contacting corners beveled, as shown at 11. Against the outer faces of these sills are placed angularly-disposed side walls or panels 12, which may be of any suitable material and extend to the lower edges of said sills. The ends of these walls are beveled to form snug joints the lines of which are at the corners of the body. The means for fastening the walls and sills together is clearly illustrated in Figs. 3, 4, and 5. Connecting devices 13 are employed, each of which is pointed at one end and consists of oppositely-extending and angularly-disposed wings 14, the free edges of which are provided with teeth 15, that extend toward the enlarged end of the device. These connecting devices are driven in from the under side of the body, so that the sets of wings are embedded, respectively, in the sills and the panels, as shown in Figs. 2 and 3. On account of the rearwardly or downwardly projecting teeth the devices will not accidentally withdraw, and they constitute secure fastening means. Moreover, they obviate the necessity of passing any fasteners through the walls or panels from their outer faces. It will of course be understood that any desired number of fastening devices may be employed. For the purpose of securely fastening the abutting ends of the walls together corner-posts 16 are employed. These posts extend the entire width of the walls, as shown particularly in Fig. 9, the arrangement being allowed by the beveled ends of the sills. Said posts fit snugly in the corners formed by the walls and are provided on their opposite faces with sharpened ribs 17, that interlock in similarly-shaped grooves 18, formed in the walls. Keeper-plates 19 maintain the posts in their interlocking relations, said plates extending across the outer faces of the posts and having their edges embedded, as shown at 20, in the walls and in angular disposition to the ribs 17. The upper ends of the plates are provided with caps 21, that extend over the tops of the posts, and said caps carry leaves 22, that are arranged along the upper edges of the panels or side walls and are secured thereto by suitable fasteners 23. The lower ends of the plates are provided with outstanding ears 24, which rest upon and are secured to the sills by screws or other fastening devices 25.

By the means above described it will be seen that the walls or panels are securely fastened together throughout their entire widths by the posts which are interlocked therewith. The keeper-plates besides holding the posts in place constitute additional strengthening means and serve as covers to prevent moisture working in between the panels and the posts, and thus prevent the moistening of the glue which is employed in making the joints.

The seat-posts are designated by the reference-numeral 26 and are arranged against the inner faces of the panels, extending the entire width thereof. To this end, therefore, the sills are provided with open-sided dovetailed sockets, (indicated at 27 in Fig. 7,) and the lower ends of the posts are provided with dovetails 28, that engage in these sockets. The posts may be glued to the inner faces of the panels, and in addition thereto spaced angularly-disposed strips 29 are passed longitudinally through the inner sides of the posts and the adjacent portions of the panels, said strips preferably being arranged at the corners of the posts, as shown in Fig. 7. It will be evident that this construction greatly strengthens the intermediate portions of the side panels or walls, and the strips prevent the ingress of moisture to the glue, which constitutes the binder between the parts. As at the corner and bottom, there are no screws or other fasteners required to be passed through the panels, and thus the necessity for plugs is obviated. It will therefore be seen that a body constructed in the manner described has many advantages, not only because of its appearance, for the outer surface is entirely without blemishes caused by fastening devices, but the structure as a whole is very strong, the posts serving as braces.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus fully described my invention, what I claim as new, and desire to secure by Letters Patent, is—

1. In a vehicle-body, the combination with angularly-disposed walls having abutted ends, of a post located against the inner faces of the walls and in the corner formed thereby, ribs carried by the post and interlocked in the inner sides of the walls, and a keeper-plate extending across the inner face of the post and having its side edges embedded in the walls at the opposite sides of the post.

2. In a vehicle-body, angularly-disposed walls having abutted ends, a corner-post interlocked with both walls and located against the inner faces thereof, and means separate from the post and interlocked with the inner sides of both walls to hold said post in its interlocking engagement.

3. In a vehicle-body, angularly-disposed walls having abutted ends, a substantially triangular post arranged in the corner formed by the walls and having two of its faces against the inner sides thereof, and a continuous keeper-plate extending across the inner third face of the post and having its edges secured to the inner sides of the walls.

4. In a vehicle-body, angularly-disposed walls, a post arranged in the corner formed by the walls and interlocked with the inner sides thereof, and a keeper-plate extending continuously across the inner face of the post and having its opposite side edges embedded in the inner faces of the walls.

5. In a vehicle-body, the combination with angularly-disposed walls having abutted ends, of a post located against the inner faces of the walls and in the corner formed thereby, said post being secured to the walls, a keeper-plate extending from one wall to the other across the inner face of the post and being secured to said walls, and an outstanding cap carried by the upper end of the plate and covering the top of the post.

6. In a vehicle-body, angularly-disposed walls, a post arranged in the corner formed by the walls and against the inner sides thereof, a keeper-plate extending across the inner face of the post and having its edges embedded in the inner sides of the walls, and a cap arranged upon the upper end of the keeper-plate, said cap extending outwardly over the top of the post and being secured to the upper edges of the walls.

7. In a vehicle-body, angularly-disposed walls having abutted beveled ends, a post arranged in the corner formed by the walls and against the inner faces thereof, a keeper-plate extending across the inner side face of the post and having its edges embedded in the walls on opposite sides of the post, a cap arranged upon the upper end of the keeper-plate, said cap extending over the top of the post and being secured to the upper edges of the walls, and means for securing the lower end of the keeper-plate to the floor of the vehicle-body.

8. In a vehicle-body, angularly-disposed walls, a post arranged in the corner formed by the walls and interlocked with the inner sides thereof, and a keeper-plate extending across the inner face of the post and having its edges embedded in the inner sides of the walls.

9. In a vehicle-body, angularly-disposed walls having abutted ends, a post arranged in the corner formed by the walls and having outstanding ribs that interlock in the inner sides of the same, and a keeper-plate extending across the inner face of the post and having its side edges embedded in the inner faces of the walls.

10. In a vehicle-body, a sill-frame having angularly-disposed sill members cut away at their contacting corners, angularly-disposed walls secured to the outer faces of the sill members, and a post secured to the inner side faces of the walls and arranged in the corner formed thereby, said post extending into the cut-away portion of the sill-frame to the bottom thereof against the inner sides of the angularly-disposed walls, and furthermore, being in engagement with the sills.

11. In a vehicle-body, a sill-frame having angularly-disposed members cut away at their contacting corners, angularly-disposed walls secured to the outer faces of the sill members, a post secured to the walls and arranged in the corner formed thereby, said post extending into the cut-away portion of the sill-frame to the bottom thereof and being interlocked with said walls, and a keeper-plate extending across the inner face of the corner-post and secured to the walls.

12. In a vehicle-body, the combination with angularly-disposed sill members having their corners cut away, of angularly-disposed side walls secured to the outer sides of the sill members, and a post located in the corner formed by the walls and secured to both of the same, said post extending downwardly into the cut-away portion and filling the same, being in engagement with the sills.

13. In a vehicle-body, a sill having a dovetailed socket in its outer portion, a wall arranged against the outer face of the sill and extending across the socket, an upright post located against the inner face of the wall and having its lower end dovetailed and seated in the socket, and means connecting and interlocked with the wall and post for securing the same together.

14. In a vehicle-body, a sill having an open-sided dovetailed socket in its outer upright side, a wall or panel arranged against the outer face of the sill, an upright post located against the inner face of the wall and having its lower end dovetailed and seated in the socket of the sill, and angularly-disposed fastening-strips interposed between the same adjacent faces of the post and wall and having their opposite side edges embedded in both said wall and post.

15. In a vehicle-body, the combination with a sill, of a panel abutted against the outer face of the sill, and a fastening device for securing the panel and sill together, said device comprising angularly-disposed oppositely-extending wings tapering to a point at one end, having their opposite ends flat, and their outer free edges serrated to provide retaining-teeth.

16. In a vehicle-body, the combination with a sill, of a wall arranged against the outer face thereof, and connecting devices for fastening the two together, said devices each comprising oppositely-projecting and angularly-disposed sets of wings that are respectively embedded in the sill and wall and have their free edges provided with teeth.

In testimony that I claim the foregoing as my own I have hereto affixed my signature in the presence of two witnesses.

LOUIS PRIEST.

Witnesses:
CHARLES N. MASSE,
HERBERT W. LORD.